Figure 1:
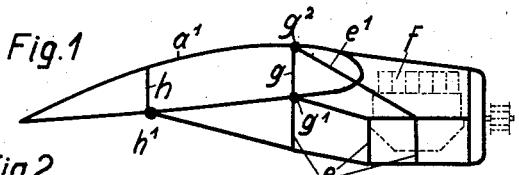

Nov. 18, 1930.  A. ROHRBACH  1,782,013
ARRANGEMENT OF ENGINES ON AIRCRAFT
Filed Sept. 4, 1926  2 Sheets-Sheet 1

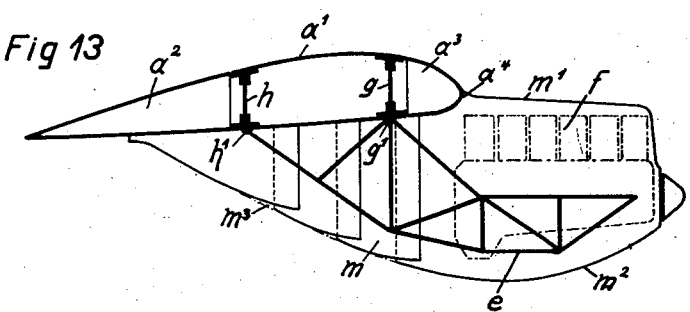
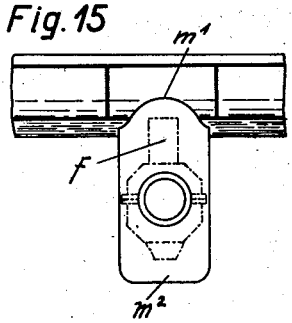
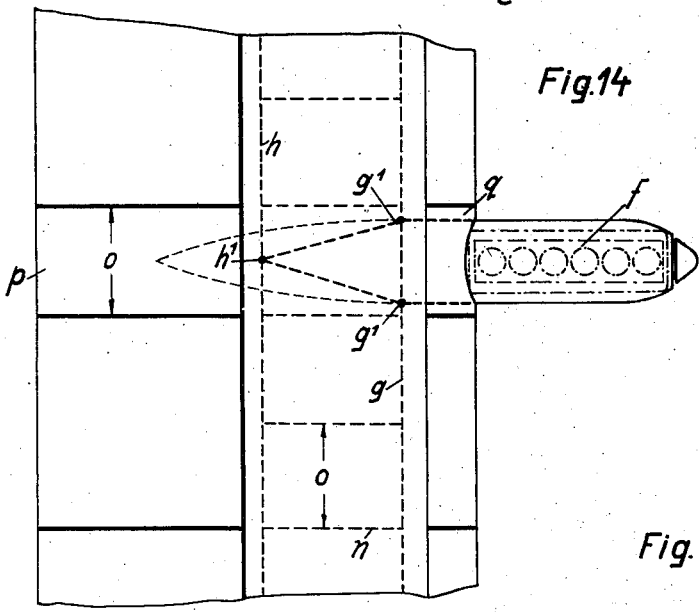
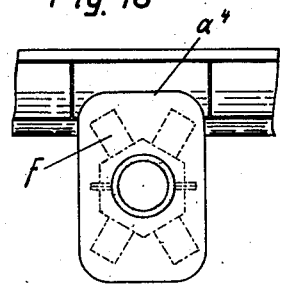
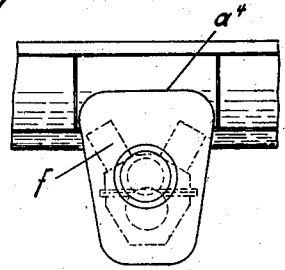
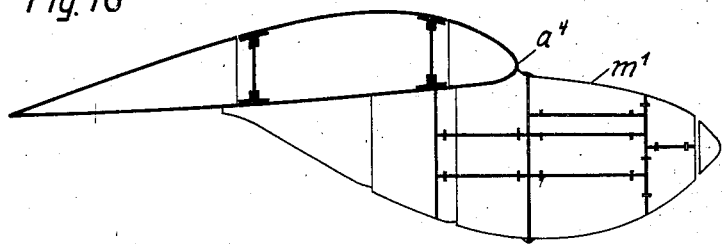
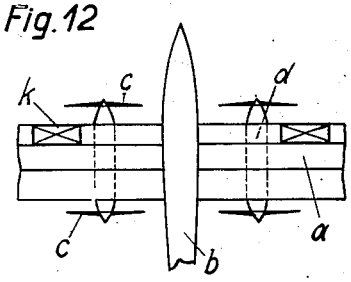

Patented Nov. 18, 1930

1,782,013

UNITED STATES PATENT OFFICE

ADOLF ROHRBACH, OF BERLIN-WILMERSDORF, GERMANY, ASSIGNOR TO ROHRBACH PATENTS CORPORATION, A CORPORATION OF DELAWARE

ARRANGEMENT OF ENGINES ON AIRCRAFT

Application filed September 4, 1926, Serial No. 133,652, and in Germany September 18, 1925.

My invention relates to airplanes and particularly to airplanes wherein the engines are supported or suspended from the wings. The object of the invention is a special structural arrangement of engine support and supporting plane wherein the engine is carried by a girder frame projecting in a fore and aft direction beyond the wing edge and wherein the engine is carried below the level of the wing chord and in such manner that the nacelle or streamlined cowl for the engine can be built into the wing profile without disturbing the air flow on the upper surface of the wing and without substantially disturbing the flow underneath the wing, while retaining the inherently sound structural features of the suspension of the engine by means of a frame attached to the bottom of the wing.

A further object of the invention is a special support or girder frame enabling the nacelle of a tractor engine to terminate in or at the central convergence point of the leading edge of the wing or to have it slope upward and merge into the leading edge somewhat above the central convergence point, and enabling the nacelle of a pusher engine to form a direct streamlined continuation of the wing top surface.

A further object of the invention is a supporting structural arrangement of the character indicated wherein the engine with its main parts occupies a position below the wing chord and including a three-point suspension at or adjacent the bottom surface, and a still further object is a five-point attachment or suspension including the above indicated three-point support and two other suspension points adjacent the top of the wing.

A still further object is a simplified structural arrangement wherein the resulting moment of inertia of the supporting frame is sufficiently large to allow of only one connection being provided for the latter, in the wing bottom surface. The lowered position of the supporting frame further permits to so arrange an engine with cylinders in line, that the upper nacelle wall begins precisely at the vertex of the wing edge. A connection of marked structural facility and statical determination is obtained with a three-point suspension of the supporting frame, said three points forming an isosceles triangle with its base adjacent or facing the engine.

With the new form of supporting arrangement the ratio of length to height offers some inconvenience with regard to air flow conditions. This disadvantage can be counteracted by so developing the cone surface shaped tapered nacelle part, which is turned away from the engine, that it merges into the wing surface at a somewhat greater distance from the frame suspension connections whereby confluence or gradual joinder of the air flows or thread is obtained in a particularly satisfactory manner.

A further improvement consists in the walls of the engine nacelle having nozzles which extend towards the nacelle interior parts. Those nozzles are used mainly for ventilation purposes; at the same time, however, they create favorable air flow conditions, by preventing interruption of the flow in the way of the slots in slotted wings, such interruption often occuring with the new nacelles and their partly much curved outer surfaces.

Figure 2:
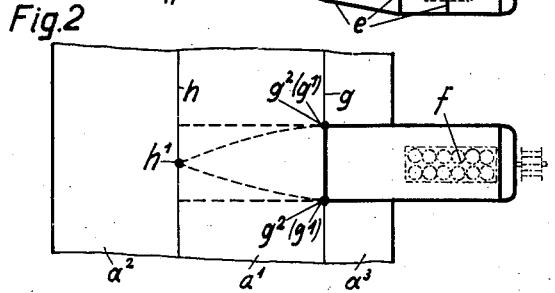
Figure 3:
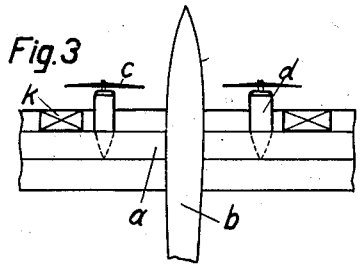

For a better understanding of the above indicated novel features of the invention and others which will hereinafter appear, reference may be had to the accompanying drawings illustrating several embodiments thereof, wherein Fig. 1 is a diagrammatic view in side elevation of one embodiment, Fig. 2 is a plan view thereof, Fig. 3 is a plan view of the craft containing the embodiment of Figs. 1 and 2.

Figure 4:
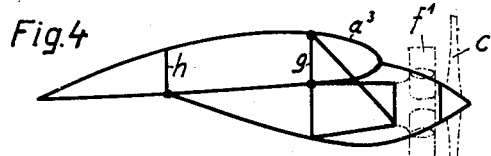
Figure 5:
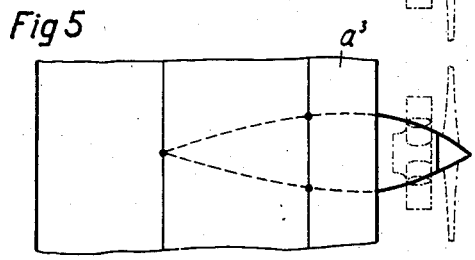
Figure 6:
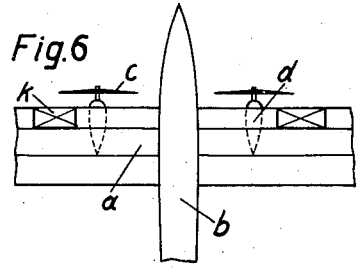
Figure 7:
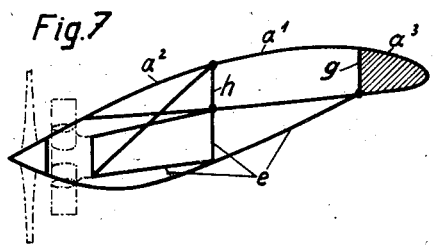
Figure 8:
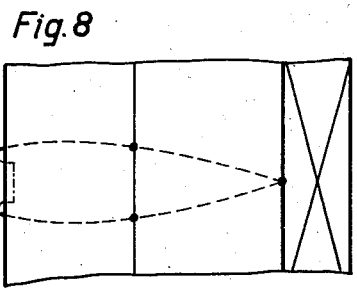
Figure 10:
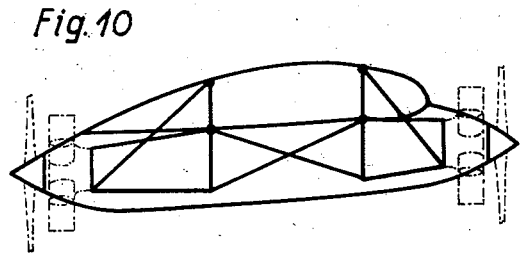
Figure 11:
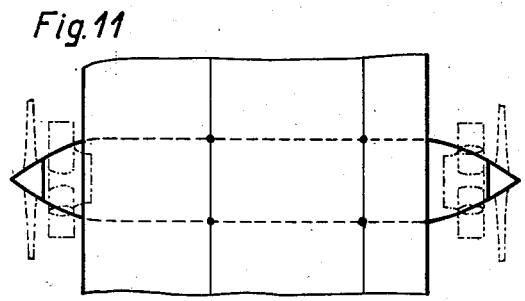
Figure 9:
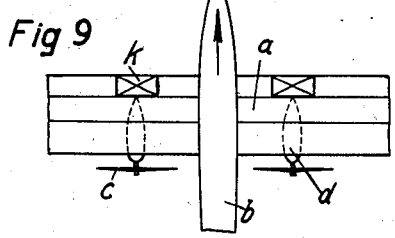

Figs. 4 to 6 inclusive, Figs. 7 to 9 inclusive, and Figs. 10 to 12 inclusive are groups of diagrammatic views corresponding to the views of Figs. 1 to 3 inclusive and containing other embodiments.

Figs. 13 to 15 inclusive are diagrammatic views illustrating another embodiment in side elevation, plan and front view respectively.

Figs. 16 and 17 are diagrammatic views in side elevation and front elevation respectively of another form of construction, and Fig. 18 is a front view of another form of construction.

In Figs. 3, 6, 9, 12 $a$ are the wings of an airplane $b$, whilst $c$ are the screws and $d$ the nacelles for the engines $f, f'$.

The nacelle frame, whose covering merges into and forms a substantial continuation of the wing covering skin, comprises an internal frame $e$ of girders and struts which are attached directly to the wing $a$ and form a supporting bed or base for the engine suspended below the wing and projecting beyond the wing edge. The arrangement is such that the suspending frame and the engine are both below the level of the wing chord, thereby rendering it possible to suspend the engine beneath the wing in the general manner indicated and at the same time to have the nacelle form a substantial continuation of the upper curvature of the wing without disturbing the air flow thereover or impairing the aerodynamic efficiency thereof.

Referring to Figs. 1–3 girders or beams $g$, $h$ of the box-shaped central portion $a^1$ of a wing $a$ (illustrated as tri-partite in the direction of flight) carry the suspending frame $e$. The suspension takes place at five points, of which four, i. e., $g^1, g^2$, are arranged at the bottom and top edge of the girder $g$ respectively, whilst the fifth point $h^1$ is situated at the bottom edge of girder $h$. $e^1$ are two connecting struts leading from the engine bed to points $g^2$. Points $g^1, h^1$ form an isosceles triangle, the base of which runs perpendicular to the direction of flight and is disposed adjacent the engine. The joints are easily attachable and detachable, in order to ensure rapid assembly or dismounting of the engine supporting frame, the details being omitted for convenience in illustration. The joints as well as the inner nacelle structure are preferably made easily accessible by arranging the wing edges $a^2, a^3$, as caps which are detachably connected to the center portion $a^1$ of the wing, the details of the detachable connections being omitted for convenience.

The frame $e$ is completely covered, forming a streamlined nacelle. The upper wall of this covering, which, according to Figs. 1 to 3, houses an engine with cylinders arranged in line, merges into the wing leading edge $a^3$ somewhat above the vertex of the latter, and forms a substantial continuation of the upper wing surface with no substantial impairment or disturbance of the air flow. The part of the nacelle turned towards the screw is rounded off as indicated, in order to ensure satisfactory slipstream conditions. The rear bottom part of the frame covering is cone surface shaped, following the three point $(g^1, g^1, h^1)$ connection of the supporting frame at the wing bottom surface, whereby confluence of the air threads flowing along the nacelle bottom at point $h^1$ is obtained, said air flow exercising a carrying effect on the wing trailing edge $a^2$. The same air flow conditions would be obtained, if the rearwards converging struts of the frame $e$ were passed through the wing bottom surface and were attached to the upper edge of the web $h$.

According to the embodiment of Figs. 4 to 6 a radial engine $f^1$ is shown driving the screw $c$ instead of the in-line-engine $f$. The frame covering has received a somewhat modified shape, providing a cone-shaped nose part and only partly enclosing the air-cooled cylinders. The upper covering wall merges into or meets the wing leading edge, at the centre of convergence, this arrangement offering the advantage, that the air flow over the entire wing top surface is absolutely free from any disturbance. The attachment of the nacelle frame at the girders $g$ and $h$ is the same as in Figs. 1–3.

In Figs. 7 to 9 a pusher-screw is used, its engine being arranged in a nacelle underneath the trailing edge $a^2$ of the wing. The principles of suspending the engine-bearing frame from the wing center portion $a^1$ have remained substantially unaltered, the only difference being that the frame $e$ of the nacelle is, in this case, mainly suspended at the girder $h$ the fifth point of suspension being at the girder or web $g$. The streamlined top-covering of the nacelle forms a continuation of the top wing-surface, whereas the bottom nacelle covering is shaped as shown in Figs. 3 to 6. The nacelle part forward of the engine extends approximately up to the girder $g$, thus causing a gradual lateral deviation of the lift air flow upon the lower surface.

Figs. 10 to 12 represent an aircraft provided with tractor and pusher screws, arranged axially in line or on tandem, each screw being driven by its own engine. The appertaining frames or nacelles may be connected together, but it is preferable that each frame or nacelle be separately detachable. The detrimental influence of light vibrations, due to the running of the engines, can be easily counteracted by arranging some shock-absorbing member at the joining point of the frames. In case of greater vibrations it is advisable to refrain from connecting the frames at all.

This new arrangement of the engines upon the wing has the further advantage, that, by incorporating fuel tanks $k$ within the wings, and particularly within the leading edges $a^3$, a natural gravity flow of the fuel to the engines is obtained, without the necessity of conducting the piping through the flight wind. Particularly good gravity conditions are obtained, when, according to Figs. 7 to 12, the engine nacelle is arranged underneath the wing trailing edge.

According to the modification of Figs. 13 to 15 the supporting frame $e$ carries a single-serial engine $f$ on a bed placed so low that the engine $f$ is entirely below the wing and the top covering $m^1$ of the frame bonnet joins the front wing cap $a^3$ at or near the central convergency point $a^4$. With this arrangement the top covering $m^1$ runs parallel to the cylinder heads, owing to the exhaust pipe being laterally arranged.

The supporting frame $e$ is only attached to the bottom edges of the two laterally arranged longitudinal girders, $g$, $h$, i. e., in two points $g^1$ of the girder $g$ and in one point of the girder $h$. Instead of this single point, two adjacent points can be chosen, in order to have the frame tapered towards the rear.

The front part of the bottom covering of the engine nacelle is arranged substantially parallel to the wing. Its rear end is conically shaped and runs up to the center of the rear cap $a^2$, which means, that it ends a substantial distance aft the connecting point $h^1$. Owing to this arrangement the air flow round the nacelle is practically undisturbed. In order to vent the interior of the nacelle air nozzles $m^3$ are provided in the rear part of the cowling; the walls of these nozzles are incorporated inside the nacelle, following, with regard to their outlets, the streamline shape of the nacelle. Thus a disturbance of the air flow, which is usually caused by protruding air exhausts and the like, is avoided.

The embodiment of the present invention represented in Figs. 16 and 17 shows the engine to take such a low position, that the upper cowling $m^1$ of the nacelle is steeply sloping forward. By way of example, Fig. 16 represents the nacelle covering being partitioned into separate hinged panels in order to render all different parts of the power plant easily accessible. This power plant consists, as shown in Fig. 17, of an engine $f$ whose cylinders are arranged in two rows, V-fashion. Owing to this arrangement the upper cowling is plane-shaped, and meets the convergency point $a^4$ of the wing not only in one point, as, theoretically, it would according to Figs. 13 to 15, but along an unbroken line. A similar arrangement is represented in Fig. 18, where the cylinders of an engine are arranged in four rows, double V or X-fashion respectively.

In case that the wing, as represented in Figs. 13 and 14, is assembled of a central main girder $a^1$, consisting of two longitudinal girders or beams $g$, $h$ and transverse walls $n$, interconnecting the longitudinal beams at regular intervals, so as to form a box-girder, and of detachably mounted leading and trailing edges $a^3$, $a^2$, these latter being subdivided along the entire wing span by transverse members, all parts are so arranged, that transverse-wall distance $o$ or length $o$ of the edge members $p$, $q$ and breadth of supporting frame or nacelle are in accordance with each other. It is then possible, without any difficulty, to adapt the power plant, including such edge members as are dependent on same with regard to their outer shape, to the somewhat standardized principles of partition of wing structure. If the breadth of the nacelle does not correspond to the length of the edge member $q$, short cap-like structures are fitted to the nacelle, being arranged laterally and parallel to the leading edge. The edge members arranged laterally of the engines, are of a multiplied $o$ length.

By the structural arrangement thus set forth, the lifting effect is not impaired by disturbance of the air flow over the top surface of the wing and, moreover, the air flow is not materially disturbed on the bottom surface of the wing, and according to this arrangement the advantage of the unimpaired air flow on the top of the wing is obtained whether the wing girders have on the whole a height corresponding to the engine or whether the height thereof is substantially less than that of the engine, the engine in any case occupying with its main parts a position below the wing chord. It is also apparent that the new engine arrangement permits of an air flow into the wing parts absolutely free from flow disturbing projections or prominences, and this is true whether the top part of the nacelle of a tractor engine terminates in the central convergence point of the leading edge of the wing or whether the top covering of the nacelle slopes upwardly and merges into the leading edge somewhat above the level of the central convergence point. The confluence of the air flow over the engine nacelle and laterally toward the latter takes place in front of or directly in the convexity vertex. On the other hand, with pusher engines the top wall of the nacelle can be formed as a direct streamlined continuation of the wing top surface. Moreover, by suitably shaping the engine nacelle, as tapering the same for instance, even a satisfactory flow of the air can be obtained, which flows around the lower part of the nacelle close to the hub, and since the supporting frame is attached to the wing bottom surface at points forming an isosceles triangle with its base arranged perpendicular to the direction of flight and adjacent the engine the nacelle may be readily tapered with its bottom surface to cause air threads or flows to be joined to effect a lifting force upon the underside of the wing before the air passes therefrom under. Moreover, in addition to the triangle or three connection points in or close to the wing bottom surface, two more connections are provided in close proximity of the wing top surface and the suspension of the nacelle in the five points simplifies the arrangement from a technical point of view. The transverse forces resulting from lateral landing shocks can be much better absorbed with a three point connection in the wing bottom surface, owing to the fact that the diagonal strut required for a four point suspension is dispensed with, and one fitting may be omitted.

By this subdivision of the engine nacelle into one frame-like support directly attached to the wing and one special streamlined outer covering of engine and supporting frame, the subject matter of the present invention differs from the usual and well known arrangement of engines underneath aircraft wings, wherein the nacelle covering at the same time supports the engine bed and forms a connection of engine bed and wing and the engine bed consists of a cylindrical plate, which, in order to obtain sufficient structural strength and a rigid connection, is reinforced by many longitudinal profiles and of considerable length. This means inconvenience of construction with the further disadvantage, that many joints are necessary for the attachment to the wings, as the engine bed supporting skin, for reasons of weight saving, should have but the lowest permissible strength, being, therefore, unable to transmit large local forces. As even the wing leading edge has been called upon to support the engine nacelle, another tension band is carried from the vertex of the leading edge to the nose of the nacelle, whereby a natural passing of the top front surface of the nacelle into the vertex of the wing leading edge is obtained; according to the invention, this could be attained only by specially lowering the frame-like support front part beneath the wing bottom surface. The use of the same body for engine covering and support offers the further inconvenience, that the accessibility of the engine is impaired, as the covering cannot be removed and no holes be cut through it.

I claim—

1. In an airplane the combination of an engine and a supporting frame therefor suspended from the wing so as to project beyond the wing edge and to be disposed beneath the level of the upper wing chord and a separate streamlined nacelle for said engine and said supporting frame, the lower walls of said nacelle merging upwardly in a fore and aft direction into contact with the lower surface and the upper walls of said nacelle forming a substantial continuation of the upper surface of the wing in the fore and aft direction.

2. In an airplane the combination of a lifting wing with an engine and an engine-supporting frame attached directly to and suspended from said wing and projecting beyond the forward edge of the wing with the engine disposed below the level of the chord of the wing and a separate stream-lined nacelle for said engine and said supporting frame whose upper part merges into the vertex of the nose wing so as to form a substantial continuation of the upper aerofoil surface and the lower walls of said nacelle extending rearwardly and merging completely into the under surface of the wing.

3. In an airplane the combination of an airplane wing an engine and supporting-frame directly attached to said wing and suspended therefrom so as to support the engine beyond the edge of the wing and at a point below the level of the wing chord and a separate nacelle for said engine and said supporting frame the upper walls of which merge directly into the vertex of the wing edge and the lower walls of which extend rearwardly and converge to a point into the under surface of the wing at a point towards the rear edge thereof.

4. In an airplane, an airplane wing, an engine-supporting frame directly attached to the wing and suspended beneath the same, one end of said supporting frame extending beyond the wing edge and forming the engine-supporting base, an engine supported upon the said base and carried beneath the level of the wing chord, and a separate streamlined nacelle, the upper portion of which fairing into the vertex of the wing edge and forms a substantial continuation of the contour of the upper surface of the wing in the fore and aft direction and the lower part is merged completely into the lower surface.

5. In an airplane, an airplane wing, a supporting-frame attached to said wing and extending in the direction of flight, one end of said supporting frame extending beyond the wing edge and forming the engine supporting base, said supporting base of the engine being disposed below the wing bottom surface with the engine supported substantially below the level of the wing chord.

6. An airplane of the character set forth in claim 5 wherein the upper part of the stream-lined covering merges substantially into the vertex of the wing edge beyond which the engine projects.

7. An airplane of the character set forth in claim 5 wherein the wing central portion is developed as a box girder with two longitudinal lateral beams which serve for the connection of the engine supporting frame.

8. An airplane of the character set forth in claim 5 wherein the wing central portion is box-shaped and includes longitudinal girders, some of which serve for the connection of the engine supporting frame, and the longitudinal girder arranged in direct proximity of the engine proper is provided with the greatest number of engine support connections.

9. An airplane of the character set forth in claim 5 wherein the supporting frame is attached to the wing in five points, four of which are situated in a plane running transversely to the direction of flight, and arranged two by two at or close to the wing bottom and top surfaces, whilst the fifth point is located at a certain distance from said plane and approximately adjacent the wing bottom surface, forming, together with the lower pair of points mentioned, an isosceles triangle.

10. An airplane of the character set forth in claim 5 wherein the engine supporting base is for a tractor engine and the bottom covering of the more or less streamlined nacelle is tapered and ending in one single point merges into the bottom surface of the wing.

11. An airplane of the character set forth in claim 5 wherein the wing is tri-partite in the direction of flight and the engine supporting frame is attached to the center portion of said wing.

12. An airplane of the character set forth in claim 5 wherein the wing is provided with detachable leading and trailing edges, the engine frame connections being easily accessible by detaching the edge parts.

13. An airplane of the character set forth in claim 5 wherein the engine bed forming part of the supporting frame occupies a substantially lowered position beneath the wing and the frame is connected with the wing at a multiplicity of points including connection with the wing bottom at three points, the said three points forming a triangle whose base line is towards the engine.

14. An airplane of the character set forth in claim 5 wherein the wing is of hollow box form consisting of longitudinal girders with cross connections arranged at regular intervals, and of leading and trailing edges detachably arranged and subdivided in wing span direction in accordance with the cross connections, and the engine nacelle is attached to a wing portion of equal length as the cross wall intervals.

15. An airplane of the character set forth in claim 5 wherein the engine supporting frame is for a tractor engine and the upper part of the nacelle wall joins the leading edge of the wing at the vertex of the edge.

16. An airplane of the character set forth in claim 5, the wing being tri-partite in the direction of flight, the center portion of said wing carrying the engine supporting frame and the leading edge containing fuel tanks.

17. An airplane of the character set forth in claim 5 wherein the wing contains at least two longitudinal beams to which the engine supporting frame is connected.

18. An airplane of the character set forth in claim 5 wherein the engine supporting frame includes an engine base which is attached to the wing by two pairs of struts, one of which leads to the bottom surface and the other leads to the upper surface of the wing.

19. An airplane of the character set forth in claim 5 wherein the wing is tri-partite in the direction of flight, the wing central portion being developed as a box girder, the edge parts being detachably fixed to said box girder, said girder carrying the engine supporting frame.

20. An airplane of the character set forth in claim 5 wherein the engine supporting frame projects forwardly of the leading edge of the wing and the upper part of the streamlined covering merges into the upper surface of the wing at a point just rearwardly of the nose.

21. In an airplane, the combination of a lifting wing and an engine supporting frame suspended from said wing including a multi-point connection with the wing including a three-point connection with the wing bottom surface and at least one other connection at a higher level, together with a streamlined covering for the engine which merges into the wing surface.

22. In an airplane of the character set forth in claim 5 wherein the wing includes a space for the accommodation of a fuel tank for supplying the engine supported below the level thereof.

23. In a multi-engined monoplane, a plurality of engines, supporting frames therefor each attached to the monoplane wing and suspending from its bottom surface, said supporting frames extending in the direction of flight, and one end of each of them providing an engine bed and extending beyond the wing leading edge, the part of the supporting frame forming the engine bed extending so far downward that the engine is substantially located below the level of the wing chord, and engine nacelles one on each supporting frame, the nacelles being stream lined, the upper wall of each of said nacelles fairing into the vertex of the wing leading edge, whilst the lower wall fairs into the wing bottom surface.

In testimony whereof, I have signed my name to this specification.

ADOLF ROHRBACH.